United States Patent [19]
Milles

[11] Patent Number: 4,818,570

[45] Date of Patent: Apr. 4, 1989

[54] PROCESS FOR THE PRODUCTION OF SMOOTH-SURFACED PARTS FROM A HARD GEMLIKE MATERIAL, AND THE USE OF THIS PROCESS

[76] Inventor: Victor A. Milles, St. Gallerstrasse 55, Wil

[21] Appl. No.: 83,854

[22] PCT Filed: Nov. 4, 1986

[86] PCT No.: PCT/CH86/00153

§ 371 Date: Jul. 14, 1987

§ 102(e) Date: Jul. 14, 1987

[87] PCT Pub. No.: WO87/03109

PCT Pub. Date: May 21, 1987

[30] Foreign Application Priority Data

Nov. 18, 1985 [CH] Switzerland ........................ 4 910/85

[51] Int. Cl.$^{4}$ ........................ B05D 5/06; B29C 43/20; B29C 59/00

[52] U.S. Cl. ........................ 427/273; 51/317; 51/319; 264/77; 264/118; 264/119; 264/125; 264/134; 264/139; 264/151; 264/162; 264/246; 264/341; 264/DIG. 59; 427/277

[58] Field of Search ........................ 264/23, 70, 73, 77, 264/118, 119, 122, 125, 134, 139, 146, 148, 151, 162, 233, 246, 284, 341, DIG. 59; 51/281 R, 317, 319; 427/271, 273, 277

[56] References Cited

U.S. PATENT DOCUMENTS

| | | | |
|---|---|---|---|
| 1,935,985 | 11/1933 | Oberherr | 264/341 X |
| 2,835,996 | 5/1958 | De Paoli, Sr. | 264/134 X |
| 3,012,901 | 12/1961 | Reese | 264/70 X |
| 3,194,856 | 7/1965 | Palmer | 264/246 X |
| 3,359,352 | 12/1967 | Powell et al. | 264/119 X |
| 3,378,617 | 4/1968 | Elmendorf | 264/162 |
| 3,381,067 | 4/1968 | Kemmler | 264/73 |
| 3,549,398 | 12/1970 | Watson | 51/319 X |
| 3,589,071 | 6/1971 | Hirschborn | 51/317 X |
| 3,882,641 | 5/1975 | Montgomery et al. | 51/317 X |
| 3,969,454 | 7/1976 | Thornber et al. | 264/122 X |

FOREIGN PATENT DOCUMENTS

| | | | |
|---|---|---|---|
| 1914522 | 10/1970 | Fed. Rep. of Germany | 51/317 |
| 3445189 | 7/1985 | Fed. Rep. of Germany . | |
| 2370708 | 6/1978 | France . | |
| 54-11963 | 1/1979 | Japan | 264/73 |
| 56-136351 | 10/1981 | Japan | 264/118 |
| 364428 | 10/1962 | Switzerland . | |
| 394950 | 12/1965 | Switzerland . | |
| 417190 | 8/1974 | U.S.S.R. | 51/317 |
| 1186545 | 4/1970 | United Kingdom | 51/317 |
| 1578596 | 11/1980 | United Kingdom . | |
| 2151906 | 7/1985 | United Kingdom . | |

*Primary Examiner*—Jeffery Thurlow
*Assistant Examiner*—Leo B. Tentoni
*Attorney, Agent, or Firm*—Helfgott & Karas

[57] ABSTRACT

In a process for the production of smooth surfaced parts, a paste material, which includes paste or granule pieces which are coated with added pigment and then pressed back together, is applied, in the form of an extrusion or a coating, to a substrate. The extrusion or coating is subjected to a first, incomplete hardening, after which it is no longer flows freely under its own weight. The surface layer, containing added pigment, is then removed from a surface to be used. This surface is subsequently smoothed, and the hardening of the coating to form a hard material is completed. The smoothing and the completion of the hardening can occur in the same processing step as a shaping for the formation of separable shaped parts. The substrate can be inseparable from the hardened coating. The surface layer, containing added pigment, can be removed by mechanical means, solvents or abrasion by a suspension in liquid or air, if appropriate in the presence of ultrasound. The extrusion can also be cut in order to form a surface layer which is free of added pigment. The process can be used for the production of gemlike shaped parts.

22 Claims, 5 Drawing Sheets

PROCESS FOR THE PRODUCTION OF SMOOTH-SURFACED PARTS FROM A HARD GEMLIKE MATERIAL, AND THE USE OF THIS PROCESS

BACKGROUND OF THE INVENTION

The invention relates to a process for the production of smooth-surfaced parts from a hard gemlike material in accordance with the preamble of claim 1, and a use of this process.

Hard semiprecious-stonelike materials for use as replacements for semiprecious stones and for the production of gemlike products have been disclosed, for example, by Patent Application DE No. 3,445,189. According to this teaching, a binder is mixed with a filler and a base pigment to a pasty consistency. The pasty material is then divided at least once into pieces, coated with an added pigment and subsequently pressed together. This still pasty material is then hardened, either as such or after a further processing step, such as, for example, calendering or other shaping.

In this process, the disadvantage becomes apparent that the surface of the paste material is completely coated by added pigment since the pieces into which the paste material is divided are always recoated with the added pigment. This also applies to the case where the paste material is employed in the form of processable granules. A decorative structure of the finished product can therefore only be seen after removal of the surface. In order to produce such a decorative, for example marble-like, structure on a shaped finished product, for example a watch casing or a knife handle, a further step, for example erosive polishing, is necessary after shaping in order to remove the added pigment coating from the visible surface of the blank and to give this surface the desired character (for example lustre).

However, such erosive polishing is disadvantageous: on the one hand, such a step makes production more expensive, and on the other hand certain shapes, for example those shapes which have recesses and indentations with inside edges, cannot be polished at all or only at very great expense. In addition, polishing accompanied by erosion is particularly disadvantageous in the case of small precision parts such as watch casings: the ideal material density is in the region of the surface of the blanks on the so-called pressing skin, and the deeper the surface layer of a blank is eroded, the more porous the final part appears. In the case of this type of result, it is often necessary to reseal the surface treated by erosive polishing by repeating the pressing.

SUMMARY OF THE INVENTION

In order to avoid these disadvantages, the invention proceeds from the knowledge that the removal of the surface layer in order to expose the decorative structure of a blank and the production of a smooth surface of the corresponding finished part can be carried out in two separate steps. A consequence of this knowledge is that it can be accepted that the removal of the surface layer does not leave behind a smooth surface of the part, but instead a matt or even rough surface: in a following step, this matt or rough surface can also be smoothed using those processes which do not produce erosion.

In order to achieve this result, a process of the type mentioned initially is characterized by the combination of process steps specified in claim 1. Advantageous improvements of the process and a use of the same can be seen from the dependent claims.

This invention thus provides a process with which smooth-surfaced parts made from a hard gemlike material can be produced continuously on a conveyor belt in an economic fashion.

BRIEF DESCRIPTION OF THE DRAWINGS

The invention is described below in further detail with reference to the drawings, in which.

DETAILED DESCRIPTION OF THE PREFERRED EMBODIMENTS

Figure 1:
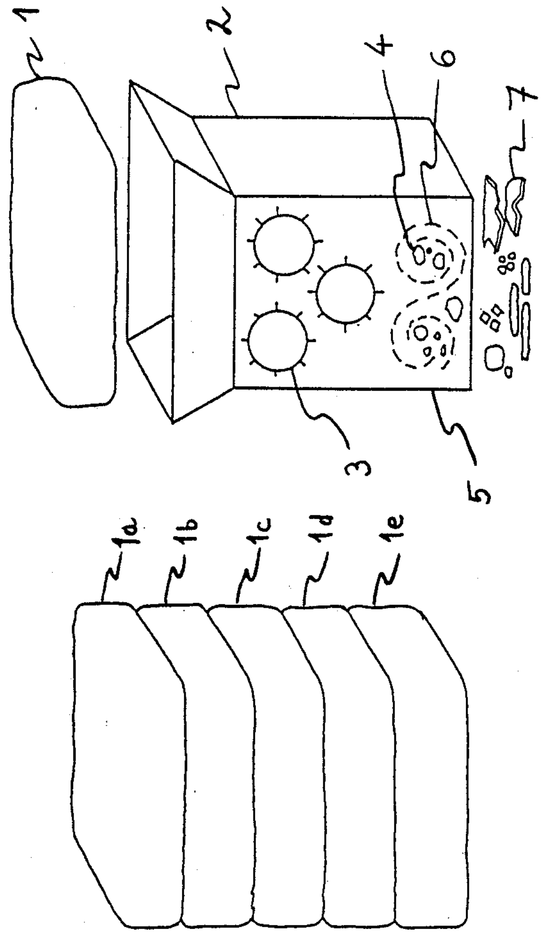
FIG. 1 shows a diagram and a device, with reference to which the preparation of the paste material used in the process according to the invention can be described.

FIG. 1 illustrates schematically how, in a fashion which is known per se (cf. DE-No. 3,445,189), a paste material 1 is repeatedly divided into pieces and kneaded back together in a masticator 2, for example with the aid of cutting and press rolls 3. This paste material, divided into pieces 4, then leaves the masticator 2 and enters a coating device 5. In this coating device 5, the pieces 4 are agitated and coated with an added pigment 6, which is symbolized by the spiral-shaped indication of the added pigment 6. At the conclusion of this process step, pieces 7 are obtained which are coated with added pigment and serve as raw materials for the next process step, which is described below. This process can also be used on granules, further breakingdown of the pieces naturally being superfluous.

The paste material 1 used can be, for example, a pasty composition of the type described in DE-No. 3,445,189, which comprises a binder, a filler and a base pigment. It is, for example, one of the various paste materials **1*a* to 1*e*** shown.

For use in the present process, the binder is a curable synthetic resin, having an inherent colour of low colour density, which is, in addition, viscous and adherent and has a low tendency towards embrittlement. The binder is, for example, a two-component epoxy resin. In addition, this synthetic resin is selected so that it hardens either in stages or sufficiently slowly for the material to be capable of remaining for some time in an incompletely hardened intermediate state between its pasty consistency at the beginning of the process and its hard character at the end of the process. In this intermediate state of incomplete hardening, the paste material just no longer flows freely under its own weight, but is still soft enough for shaping by pressing, embossing, cutting and the like.

The filler is, for example, a mineral filler which gives the completely hardened finished part its actual hardness, and can contribute to the base colour. For example, quartz powder, marble powder, crushed silica gel, aluminium oxide etc. can be used, that is to say, in general, substances having a Mohs hardness of 5 to 8, which corresponds to the hardness of semiprecious stones such as turquoise, agate, onyx, carnelian etc.

The base pigment serves for production of the base colour or, if the filler also contributes to the colour, for production of the predominant colour. Virtually all organic or inorganic pigments which are conventional for colouring synthetic resins can be used, the organic pigments generally having greater tinctorial strength.

The various paste materials 1*a* to 1*e* illustrated in FIG. 1 differ from one another, for example, in the colour, for example one being black, another white, and others simulating the base colours of lapis, turquoise or rhodonite gemstones and the like.

The added pigment, which serves for achieving the desired decorative structure or pattern of the finished part to be produced using the process described, is also selected depending on the paste material selected. The added pigment can, for example, be white, black or metal-coloured and can accordingly comprise, for example, titanium dioxide, graphite, aluminium, copper, brass, bronze and the like in the form of dust, powder, flakes or granules. If required, a mixture of pigments can also be employed, either as a homogeneous mixture of pigments or, in order to achieve particular effects, an inhomogeneous mixture of pigments.

Figure 2:
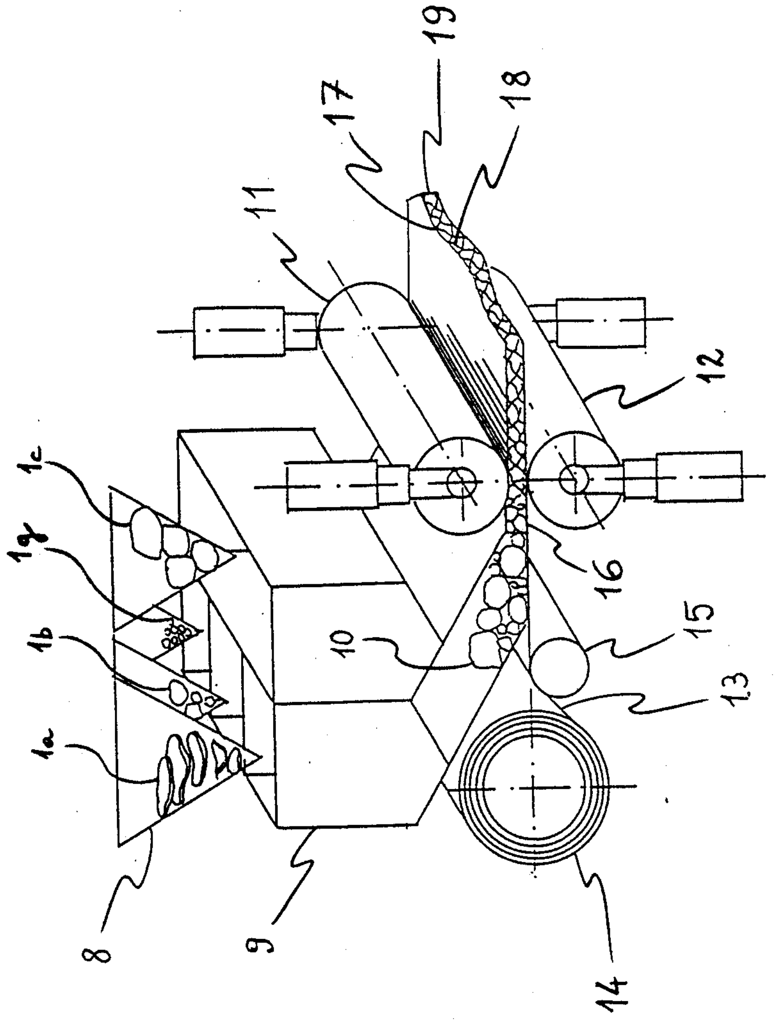
FIG. 2 shows a device, with reference to which the process steps leading to the production of a coating on a substrate can be described.

FIG. 2 illustrates schematically how pieces 7 of various paste materials or granules, coated with added pigment, are each introduced into a hopper 8 so that they can each proceed from there into a metering device 9. In FIG. 2, four hoppers 8 and four corresponding metering devices 9 in which, for example, three different paste materials 1*a*, 1*b* and 1*c* and a granulate 1*g* are processed, were represented as an example. The pieces 10, coated with added pigment and delivered by the metering devices 9, are recombined, but not blended, at the outlet of the metering devices 9 by pressing together and compression in a manner which is known per se (cf. DE- No. 3,445,189). This takes place by continuous feeding of the pieces 10 to a pair of rolls having rolls 11 and 12, between which the pieces 10 are continuously compressed to form a layer. Simultaneously, a bandlike substrate 13 is drawn off a storage roll 14 and fed via a guide roll 15 to the underside 16 of the paste material layer mentioned. In this fashion, the paste material, comprising the pieces 10, coated with added pigment and then pressed back together, is continuously applied to the continuously advancing substrate 13 in the form of a coating 17. The substrate 13 comprises, for example, a film made from a plastic such as nylon, polyethylene, polycarbonate, polyimide and the like.

The composite 19, comprising the coating 17 and its substrate 13, is thus produced continuously.

Many possible variations for the decorative structure of the coating 17 arise depending on the number of pieces of the respective selected paste materials or granules metered-in in each case, the added pigment previously lying on the surface of the pieces 10 now being located on the grain boundaries 18, produced from these surfaces, in the coating 17. However, the upper and lower surfaces of the coating 17 each form, in a broader sense, a plane composed of grain boundaries, and the upper and lower surfaces of the coating 17 are indeed coated with the added pigment, which naturally covers the desired decorative structure, i.e. the structure veins and, in general, the pattern of the finished part to be produced. In order to expose the desired decorative structure, it is thus necessary to remove the added pigment from the visible surface of the finished part produced, which, however, is extremely difficult with the pasty consistency of the coating 17 if no further measures are taken according to the present invention.

Figure 3:
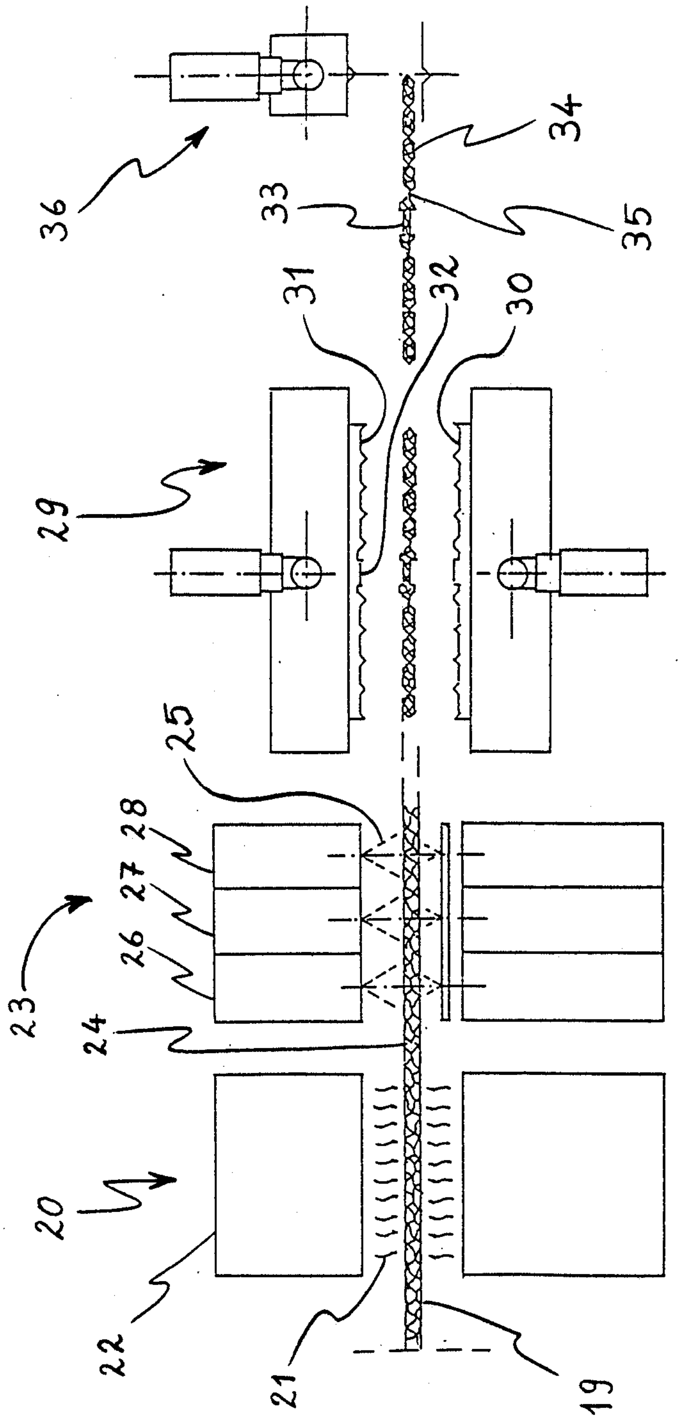
FIG. 3 shows a device, with reference to which further process steps of the process according to the invention can be described.

In order to expose the desired decorative structure, the composite 19, comprising the coating 17 and its substrate 13, are fed continuously, in a next process step, which is illustrated schematically in FIG. 3, to a processing station 20. In this station, the coating 17 is continuously subjected to a first, incomplete hardening in such a fashion that the incompletely hardened paste material of the coating 17 is just no longer capable of flowing under its own weight when, on continuous advancement, it reaches the second processing station 23 described below. If the incompletely hardened paste material corresponds to the above definition, it has approximately the correct consistency to be subjected to the process steps described below.

The incomplete hardening desired can take place, for example, by thermal treatment of the composite 19 in the processing station 20. As indicated in FIG. 3 by the rays 21, an infra-red lamp 22 can warm the upper and lower surfaces of the composite 19 in the processing station 20. For the same purpose, however, warm air can alternatively be blown onto the upper and lower surfaces of the composite 19, or they can be sprayed with warm water.

The second processing station 23 is arranged at a distance from the first processing station 20 such that, depending on the kinetics of the hardening process and the advancement rate of the composite 19, approximately that degree of hardening is achieved at which the incompletely hardened paste material of the coating 17 is just no longer capable of flowing under its own weight when the composite 19 reaches the second processing station 23 during its continuous advancement.

In this second processing station 23, the upper side 24 of the composite 19 is treated in a manner such that the surface layer, containing the added pigment, of the coating 17 is removed.

As indicated in FIG. 3 by the spraying at 25, the removal of the surface layer, containing added pigment, of the coating 17 can take place by the successive process steps of dissolving, washing and drying of the upper side 24 of the composite 19. To this purpose, the composite 19, during its continuous passage through the processing station 23, first passes a dissolution point 26, where the upper side 24 of the composite 19 is sprayed with a solvent, then a washing point 27, where the solvent is rinsed off the upper side 24 of the composite 19 by spraying with a washing agent, the action of the solvent thereby being ended, and finally passes a drying point 28, where the upper side 24 of the composite 19 is blown free of washing agent by a gas stream.

During this procedure, the action of the solvent is adjusted, by suitable selection of the solvent taking into account the temperature on the upper side 24 of the coating 17 and the temperature of the solvent itself, so that the upper side 25 of the composite 19 at the exit from the second processing station 23 is freed from the surface layer, containing added pigment, of the coating 17, so that the desired decorative structure, i.e. the structure veins and, in general, the pattern of the finished part to be produced, on the upper side 24 of the coating 17 has become visible. The solvent is thus selected so that it is capable of dissolving the incompletely hardened synthetic resin in the coating 17. Acetone, trichloroethylene and the like, for example, can be used as solvents. It is recommended that the solvent be employed cold, since cooling of the surface layer, containing added pigment, of the coating 17 by the solvent slows both its dissolution and its hardening, which allows more time for treating the surface layer of the coating 17 and thus simplifies the design of the machine intended for carrying out the process.

The washing agent used can be a liquid which is not a solvent (or is at least not a good sovent) for the incompletely hardened synthetic resin, but is miscible with the solvent. The dilution and rinsing-off of the solvent by the washing agent thus ends the dissolution of the surface layer of the coating 17. For the same reasons as in the case of the solvent, it is recommended that a cold washing agent be employed. If acetone is used as solvent, water and, in particular, cold water can be used as washing agent. If trichloroethylene is used as solvent, alcohol, petroleum ether or benzene can be used as washing agent and, in particular, as cold washing agent.

The drying gas used for blowing off the washing agent can be air, in particular dry air, and, if required, cold air.

In a number of variants of the second processing station 23, which are not represented, the upper side 24 of the composite 19 can be treated by mechanical erosion in order to remove the surface layer, containing added pigment, of the coating 17.

In one of these variants, the upper side 24 of the coating 17 can be sprayed with a dispersed abrasive agent. This abrasive agent can be a powder suspended in a liquid, for example a suspension of emery in water, or alternatively a powder atomized in a gas, for example a suspension of emery in a stream of air. In another variant, the mechanical erosion of the surface layer, containing added pigment, of the coating 17 can be carried out using an adhesive tape or by planing, grinding or similar machine treatment.

Although the desired decorative structure, i.e. the structure veins and, in general, the pattern of the finished part to be produced, have become visible on the upper side 24 after the treatment, described above, of the upper side 24 of the composite 19 on passing through the second processing station 23, this upper side 24 is, however, not yet decoratively. as smooth as a mirror, but instead has become matt or even rough due to the removal of the surface layer. The composite 19 emerging from the second processing station 23 is therefore fed continuously to a third processing station 29, where the upper side 24 of the composite 19 is smoothed, as described below, in order to impart it with the final desired decorative appearance.

In principle, this process step of smoothing of the upper side 24 of the composite 19 is independent of the process step, still necessary, of shaping for formation of the desired shaped parts from the paste material of the coating 17 and of the process step, still necessary, of the hardening of the paste material of the coating 17, or the shaped parts formed therefrom, to form a hard material. However, it is advantageous to carry out the process steps of smoothing, shaping and hardening in one operation, as illustrated, for example, in FIG. 3. The third processing station 29 is therefore designed as a hot and moulding press, for example as an appropriate stamp press. In this, the continuously fed composite 19 is pressed between a heated die plate 30 and a heated stamp 31, the stamp 31 having mirror-smooth surfaces 32 which impart the desired smooth appearance on the upper side 33 of the shaped part 34 now produced from the composite 19. The paste material is simultaneously heated, which restarts the hardening of the binder, until the paste material has been converted into a hard material. Of course, the temperature of the die plate and of the stamp are selected, depending on the temperature and the degree of hardening already achieved by the fed pressing material, the residence time of the shaped part in the press and other parameters which are known per se, so that the finished parts achieve the desired degree of hardness, if appropriate after a suitable waiting or storage time.

It is advantageous, inter alia, that a particularly high pressing pressure is not necessary during this hot and moulding pressing since the press is processing a still incompletely hardened material, that is to say one which is still fairly soft, and the press only offers slight resistance. It is also advantageous that a notable amount of pressing or stamping waste is not produced, which contributes to keeping the production costs low.

The shaped parts can be given a shape such that they can easily be separated from one another. For example, they can have weak points 35 along which they are cut off, stamped off or broken off from the hardened composite 19, which is indicated schematically in FIG. 3 by the stamping device 36. If deburring is necessary, it can be carried out in the same operation.

As a rule, the substrate 13 adheres inseparably to the paste material of the coating 17 after the first, incomplete hardening of the latter. This is even an advantage if the underside of the composite 19 or of the shaped part 34 serves, for example, as an adhesion surface during use of the finished part or is further processed in another fashion, since this further processing can be simplified by suitable choice of the material for the substrate 13. In any case, after shaping by the die plate 30 of the press, the substrate forms a usually acceptable underside of the finished part, for example a smooth plastic layer on the underside of a finished part such as a casing or face for a watch. Since the substrate 13 is generally softer than the hardened coating 17 or than the shaped part 34, it is easily broken during separation of the shaped parts from one another and separated along with the shaped parts.

The finished parts produced in such a fashion have a gemlike structure which makes possible a wide variety of uses for decoration purposes, both as small parts, for example casings and faces of watches, and also flat parts, for example tiles, stove tiles etc.

Figure 4:
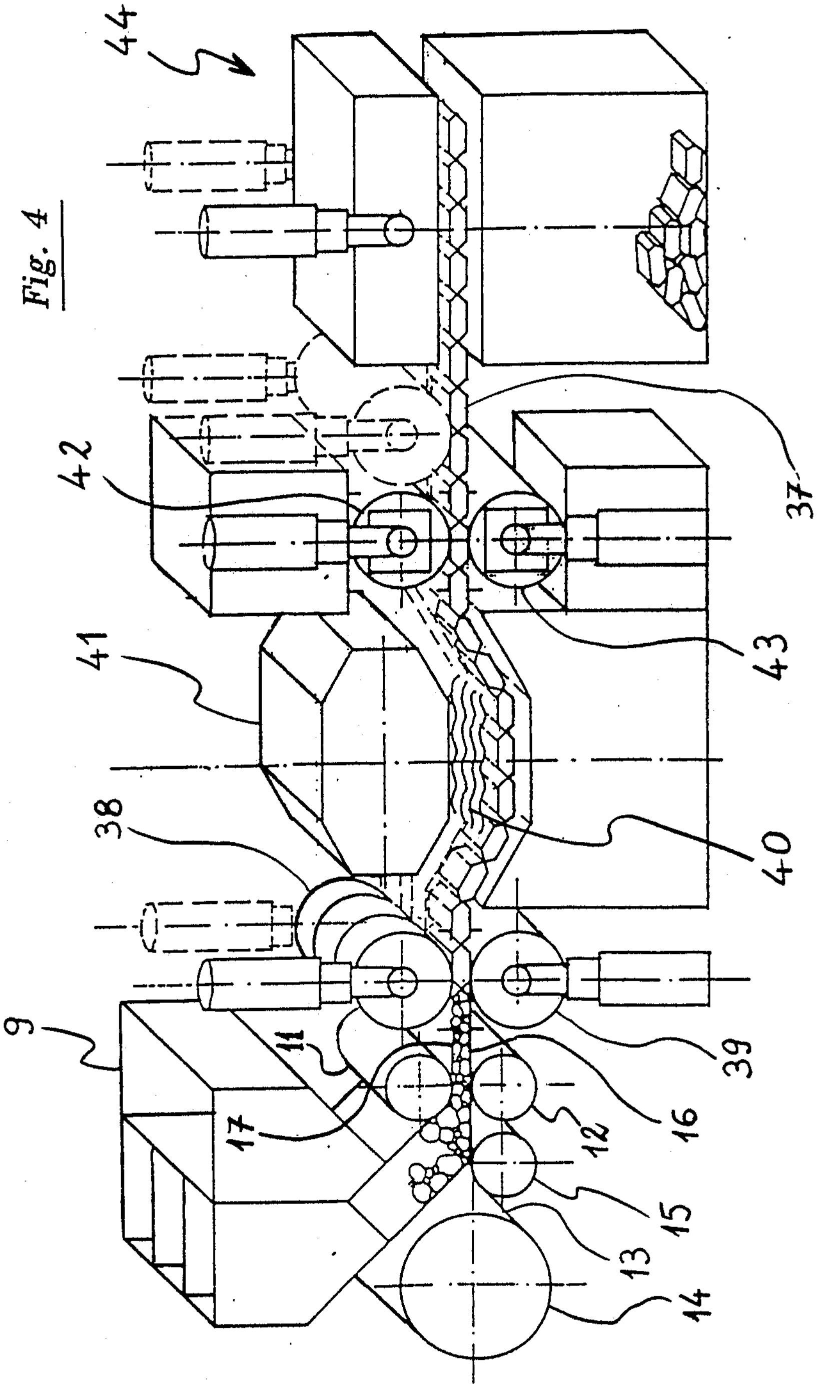
FIG. 4 shows a device, with reference to which a variant of the process according to the invention, in which ultrasound is used, can be described.

A variant of the process described is illustrated schematically in FIG. 4. The essence of this variant is that the surface layer, containing added pigment, of the coating 17 is removed in the presence of ultrasound.

The device represented schematically in FIG. 4 illustrates the device already described in connection with FIG. 2, the same reference numbers being used for equivalent parts. As an example of a variant, the shaped parts 37 are here already formed between the pair of rolls 38 and 39 before removal of the surface layer, containing added pigment, of the coating 17. Heating for incomplete hardening of the paste material of the coating 17 is unnecessary inasmuch as it is presumed in this example that the hardening starts as early as the metering device 9 and that, at room temperature or at the operating temperature of the metering device 9, the suitable degree of hardening is achieved when the shaped parts 37 reach the pair of rolls 38 and 39. The shaped parts 37 are still held together by the substrate 13, which has not yet been separated, and dipped and passed through a bath 40. This bath 40 contains a suspension of an abrasive agent in a liquid, for example a suspension of emery in water. An ultrasound generator 41, which agitates the suspended particles and thus causes abrasion of the surface layer, containing added pigment, of the individual shaped parts 37, dips into this bath 40 and into this liquid. As in FIG. 3, there then follow smoothing and hardening of the surface of the shaped parts 37, here with the aid of a hot press having a pair of rolls 42 and 43 and finally stamping-out and, if appropriate, deburring, and separation of the substrate 13 in the device 44.

Figure 5:
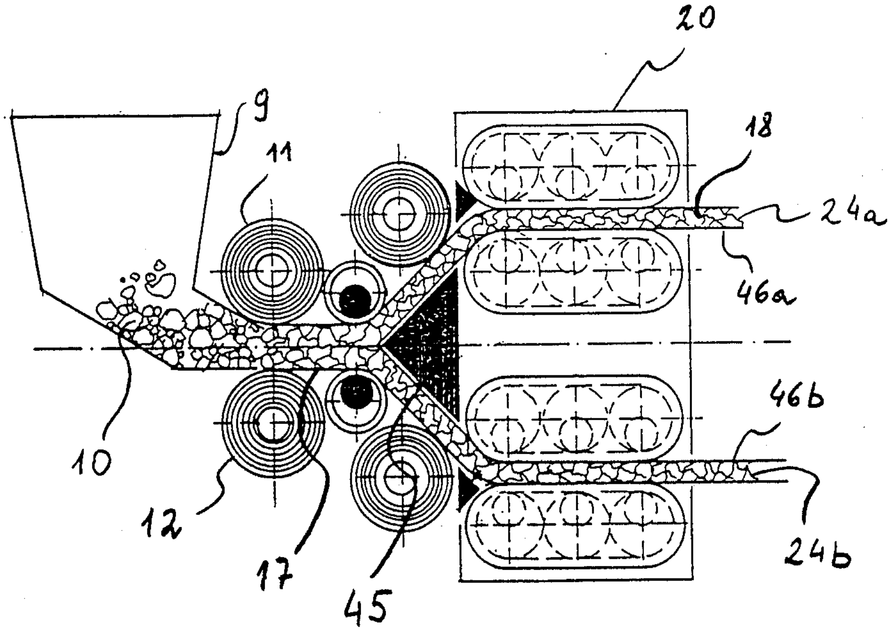
FIG. 5 shows a device, with reference to which a variant of the process according to the invention, in which an extrusion is formed instead of a coating, can be described.

The device illustrated schematically in FIG. 5 is used for carrying out a variant of the process. The same reference numbers as in FIGS. 2 to 4 are used for parts of this device according to FIG. 5 which are equivalent to certain parts of the devices already described. In the device according to FIG. 5, a shaped extrusion 17 is formed. In FIG. 5, this takes place with the aid of rolls, such as 11 and 12, but for forcing out the extrusion 17, other devices which are known per se can also be used, for example a ram-type press and the like. The surface to be used, having no coating with added pigment, is formed by cutting the shaped extrusion 17. In FIG. 5, this takes place by cutting the shaped extrusion 17 parallel to its feed direction with the aid of a wedge-shaped cutting-up device 45, so that the shaped extrusion 17 is divided in the longitudinal direction into two part shapes **24*a* and 24*b*. Smoothing of the surfaces 46*a* and 46*b* to be used of the part shapes 24*a* and 24*b* by the same principle as was described in connection with FIG. 4 can subsequently take place in the same processing step as the shaping for formation of shaped parts, which can be separated from one another, from at least one of the part shapes 24*a* and 24*b***. The hardening of the shaped parts can also be completed in the same processing step as the shaping.

In a variant which is not represented, the cutting of the shaped extrusion can take place perpendicular to its feed direction, so that the extrusion is divided into successive pieces. Here too, smoothing of the surface to be used can take place, as above, in the same processing step as shaping for formation of shaped parts from the extrusion pieces. The hardening of the shaped parts can also be completed in the same processing step as the shaping.

I claim:

1. Process for the production of smooth-surfaced shaped parts from a hard gemlike material, in which process pieces of a granulate or a divided paste material are coated with an added pigment, pressed together and then hardened to form a hard material, wherein the paste material, comprising pieces which are coated with added pigment and then pressed together, is pressed out to form a pressed-out strand, the pressed-out strand being subjected to a first, incomplete hardening, after which the incompletely hardened paste material of the strand is just no longer capable of flowing under its own weight, a strand surface to be used which has no coating of added pigment, being formed after said first, incomplete hardening, said surface to be used being smoothed, and the hardening of the paste material of the strand to form a hard material finally being completed.

2. Process according to claim 1, wherein the strand is formed in the shape of a coating and is applied to a substrate, and wherein the surface to be used is formed by removing a surface layer, containing added pigment, from the surface of the coating.

3. Process according to claim 2, wherein the smoothing of the surface of the coating is carried out in the same step as shaping for formation of the shaped parts, which can be separated from one another, from the paste material of the coating.

4. Process according to claim 3, wherein the completion of the hardening of the shaped parts is carried out in the same step as the shaping.

5. Process according to claim 4, wherein the substrate is inseparable from the hardened coating, so that the substrate is also divided on separation of the shaped parts from one another.

6. Process according to claim 2, wherein the surface layer, containing added pigment, of the coating is removed by the action of a solvent on the surface of the coating.

7. Process according to claim 2, wherein the surface layer, containing added pigment, of the coating is removed by the action of an abrasive agent, dispersed in a fluid, on the surface of the coating.

8. Process according to claim 7, wherein the abrasive agent is suspended in a liquid.

9. Process according to claim 7, wherein the abrasive agent is atomized in a stream of air.

10. Process according to claim 6, wherein the removal of the surface layer, containing added pigment, from the surface of the coating is carried out in the presence of ultrasound.

11. Process according to claim 2, wherein the surface layer, containing added pigment, of the coating is removed by the action of a mechanical agent on the surface of the coating.

12. Process according to claim 11, wherein the mechanical agent is an adhesive tape.

13. Process according to claim 1, wherein the strand is formed in the shape of a shaped extrusion and the extrusion surface to be used, having no coating of added pigment, is formed by cutting the shaped extrusion.

14. Process according to claim 13, wherein the cutting of the shaped extrusion is performed parallel to its feed direction, so that the shaped extrusion is divided in the longitudinal direction into at least two part shapes.

15. Process according to claim 14, wherein the smoothing of the surface to be used is performed in the same processing step as shaping for formation of shaped parts, separable from one another, from at least one of the part shapes.

16. Process according to claim 13, wherein the cutting of the shaped extrusion is performed in a direction perpendicular to its feed direction, so that the extrusion is divided into successive pieces.

17. Process according to claim 16, wherein the smoothing of the surface to be used is performed in the same step as shaping for formation of shaped parts from the pieces of the extrusion.

18. Process according to claim 15 or 17, wherein the hardening of the shaped parts is completed in the same step as the shaping.

19. Use of the process according to claim 1 for the production of gemlike shaped parts.

20. Process according to claim 7, wherein the removal of the surface layer, containing added pigment, from the surface of the coating is carried out in the presence of ultrasound.

21. Process according to claim 8, wherein the removal of the surface layer, containing added pigment, from the surface of the coating is carried out in the presence of ultrasound.

22. Process according to claim 9, wherein the removal of the surface layer, containing added pigment, from the surface of the coating is carried out in the presence of ultrasound.

* * * * *